(12) United States Patent  
Haas

(10) Patent No.: US 7,465,131 B2
(45) Date of Patent: Dec. 16, 2008

(54) GEAR SHAPING MACHINE

(75) Inventor: Gebhard Haas, Altusried (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 0 days.

(21) Appl. No.: 11/977,417

(22) Filed: Oct. 23, 2007

(65) Prior Publication Data

US 2008/0112770 A1  May 15, 2008

(30) Foreign Application Priority Data

Nov. 7, 2006  (DE) ........................ 10 2006 052 474

(51) Int. Cl.
  *B23F 19/06* (2006.01)
  *B23F 5/16* (2006.01)
(52) U.S. Cl. ................................. 409/33; 409/2; 409/29
(58) Field of Classification Search .................. 409/2, 409/29, 31, 33, 36, 10, 25, 26, 28, 30, 38, 409/41, 42, 50, 51, 52, 53; 451/47, 219, 451/275
See application file for complete search history.

(56) References Cited

U.S. PATENT DOCUMENTS

| 4,487,535 | A  | * | 12/1984 | Johnson et al. ............... 409/60 |
| 4,606,682 | A  | * | 8/1986  | Miller ......................... 409/34 |
| 4,695,209 | A  | * | 9/1987  | Noguchi et al. ............... 409/42 |
| 4,786,218 | A  | * | 11/1988 | Feuser .......................... 409/2 |
| 6,712,566 | B2 | * | 3/2004  | Stadtfeld et al. .............. 409/26 |
| 6,905,292 | B2 | * | 6/2005  | Schuon ......................... 409/2 |
| 2003/0113177 | A1 | * | 6/2003 | Fahrer et al. .................. 409/51 |

FOREIGN PATENT DOCUMENTS

DE  1627370  7/1971
DE  3809802 C2  9/1989

* cited by examiner

*Primary Examiner*—Dana Ross
(74) *Attorney, Agent, or Firm*—Alleman Hall McCoy Russell & Tuttle

(57) ABSTRACT

A gear shaping machine for the manufacture or machining of gears having a shaping tool and a shaping head bearing the shaping tool, where the shaping head is movable transversely to the shaping direction for the delivering and lifting of the shaping tool to the workpiece. A direct drive is provided for this purpose which moves the shaping head transversely to the shaping direction. Furthermore a corresponding method for the manufacture or machining of gears is described.

20 Claims, 2 Drawing Sheets

GEAR SHAPING MACHINE

CROSS REFERENCE TO RELATED APPLICATION

This application claims priority to German Patent Application No. 10 2006 052 474.8, filed Nov. 7, 2006, which is hereby incorporated by reference in its entirety for all purposes.

BACKGROUND

The present disclosure relates to a gear shaping machine for the manufacture or machining of gears comprising a shaping tool and a shaping head bearing the shaping tool, wherein the shaping head is movable transversely to the shaping direction for the delivering and lifting of the shaping tool to the workpiece.

With such gear shaping machines, the shaping mechanism carries out an oscillating stroke movement through the workpiece, with a toothed arrangement being produced corresponding to the shape of the shaping tool and the path of the shaping tool through the workpiece. The shaping tool and the workpiece rotate around their axes in gear coupled manner in this context. To avoid the shaping tool brushing against the workpiece in the reverse stroke, the shaping tool is lifted in the cycle of the stroke movement in the reverse stroke and is delivered again in the working stroke, for which purpose the shaping head bearing the shaping tool is movable transversely to the shaping direction.

With known gear shaping machines, the lifting and delivery of the shaping tool usually takes place via a cam rotating continuously and gear coupled to the stroke drive as well as via hydraulic or resilient restoring elements. Such a gear shaping machine is e.g. known from DE 16 27 370. The shape of the cam substantially determines the path of the shaping tool.

It is disadvantageous in this known device that the lifting path in the reverse stroke of the shaping tool cannot be varied without changing the cam. This is important because a smaller lifting path is required for the finish machining than for the rough machining to reduce the dynamic forces and thus to improve the smooth running of the gear shaping machine. A change of the cam is also required on the conversion of the manufacturing process from internal gears to external gears, and vice versa, because the lifting direction changes in each case. A complicated toggle system is therefore known from DE 38 09 802 in which the toggle, which is adjustable in its length, is in communication with the cam which determines the path of the shaping tool. The lifting path can thus be mechanically influenced at least in part by setting the length of the toggle.

However, in the working stroke, the shaping tool must be guided on an exact path which must correspond to the required tooth flank direction. This can be cylindrical, spherical or conical or can be composed of a combination of these possibilities. Since, however, the path of the shaping tool in known gear shaping machines is still determined by the shape of the cam, a change of the cam is also necessary to generate different tooth flank directions and on gear corrections.

It is therefore the underlying object of the present disclosure to provide a gear shaping machine in which the shaping tool can be guided in any desired adjustable path both in the working stroke and in the reverse stroke. Gear errors caused by vibrations and elasticities of the machine should moreover be corrected.

SUMMARY

This object is solved in accordance with the present disclosure by a gear shaping machine for the manufacture or machining of gears comprising a shaping tool and a shaping head bearing the shaping. In this context, with a generic gear shaping machine, a direct drive is provided which moves the shaping head transversely to the shaping direction. The movement of the shaping head and thus of the shaping tool can thus be controlled directly both in the reverse stroke and in the working stroke so that any desired paths can be set. Cams and hydraulic or resilient restoring elements can thus in particular be dispensed with, whereby the lifting and delivery of the shaping tool can be set independently of the stroke movement and thus variably. The desired tooth flank direction (cylindrical, spherical, conical or a combination thereof) can thus be achieved, while a variable lifting path can be used in the reverse stroke in dependence on the machining type (roughing, finishing) and on the manufacturing processes (internal gears or external gears).

The direct drive is advantageously an electric motor direct drive and its control takes place via electronics. The electric motor direct drive thus permits an exact guidance of the shaping tool during the oscillating stroke movement so that the lifting and the delivery of the shaping tool to the workpiece can be controlled as desired via the electronics.

The direct drive advantageously drives an eccentric shaft which moves the shaping head transversely to the shaping direction via an intermediate lever. A direct transmission of a rotary movement generated by the direct drive into a movement of the shaping head and thus of the shaping tool transversely to the shaping direction thus results. This permits a precise and fast movement of the shaping tool.

The shaping head is advantageously rotatably supported at bearing points, with the intermediate lever engaging at a position between the bearing points and the shaping tool at the shaping head. The shaping head can thus pivot via the intermediate lever around an axis arranged transversely to the shaping direction.

The gear shaping machine in accordance with the present disclosure advantageously has a measuring system which is arranged at the direct drive and monitors the movement of the direct drive. This permits an indirect monitoring of the position of the shaping head and thus permits an exact control of the direct drive.

Alternatively, the measuring system can also be arranged at the eccentric shaft so that it monitors the position of the eccentric shaft.

Further advantageously, the gear shaping machine in accordance with the present disclosure has a measuring system which is arranged at the shaping head and monitors the position of the shaping head. The transverse movement of the shaping head can thus be monitored directly and the shaping head can be tracked in accordance with the desired shaping tool path.

Further advantageously, the gear shaping machine of the present disclosure has a measuring system arranged at the shaping head and a measuring system arranged at the direct drive or at the eccentric shaft. A higher precision can be achieved in the guidance of the shaping tool by the use of two measuring systems. Vibrations and elasticities of the machine can in particular also thus be noted and corrected.

The direct drive which moves the shaping head transversely to the shaping direction is advantageously a brushless torque motor. Such a torque motor already known from the prior art rotates comparatively slowly and is characterized by a very high acceleration and extreme precision. The use of such a torque motor thus permits an exact movement of the shaping tool even with very fast stroke movements. The productivity of the gear shaping machine can thus in particular also be increased with a simultaneously high variability.

The present disclosure furthermore comprises a method for the manufacture or finishing of gears using a gear shaping machine, wherein a shaping head bearing the shaping tool is moved transversely to the shaping direction by a direct drive for the delivery and lifting of the shaping tool to the workpiece. The advantages already named above result from this method.

The direct drive is advantageously electronically controlled in the method in accordance with the present disclosure. Further advantageously, the position of the shaping head transversely to the shaping direction is monitored by a measuring system and is tracked in accordance with a desired shaping tool path.

The method is advantageously carried out using one of the gear shaping machines described above.

DETAILED DESCRIPTION

Figure 1:
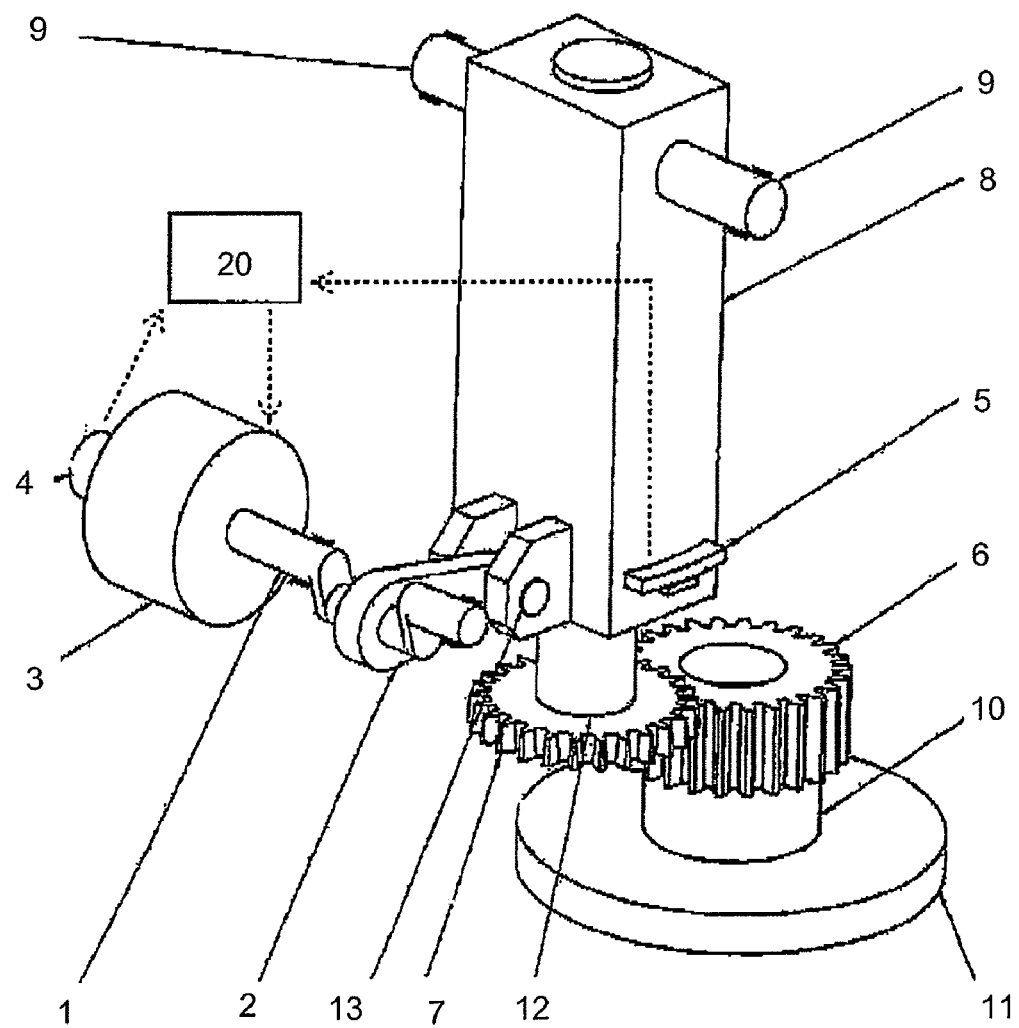
FIG. 1 shows a perspective view of an embodiment of the gear shaping machine in accordance with the present disclosure.

The present disclosure will now be described in more detail with reference to the drawings.

The embodiment of the gear shaping machine in accordance with the present disclosure has a shaping tool 7 which is rigidly connected to a shaping spindle 12. The shaping spindle 12 is in turn hydrostatically supported in a shaping head 8. Due to the oscillating stroke movement of the shaping spindle 12, the shaping tool 7 moves in an oscillating manner through the workpiece 6 which is clamped via a clamping apparatus 10 on a table 11. In this process, the shaping spindle 12 with the shaping tool 7 and the workpiece 6 rotate simultaneously around their longitudinal axes in gear coupled fashion. The shaping head 8 which bears the shaping tool 7 via the shaping spindle 12 is rotatably supported at the bearing points 9 around an axis extending transversely to the shaping direction for the delivery and lifting of the shaping tool 7 from the workpiece 6 during the stroke movement. The shaping tool 7 can thus be moved transversely to the shaping direction by a movement of the shaping head 8 around the axis of rotation formed by the bearing points 9.

The direct drive 3 in accordance with the present disclosure is provided for this purpose and drives a rotatably supported eccentric shaft 1. This eccentric shaft is connected to the shaping head 8 via an intermediate lever 2 and a bolt 13 and moves said shaping head exactly on a path which can be set as desired, while the shaping spindle 12 with the shaping tool 7 moves through the workpiece 6 in an oscillating fashion. The shaping tool can thus be guided on a path which can be set as desired in the working stroke. The desired tooth flank direction (cylindrical, spherical, conical or a combination thereof) arises in this context, while a variable lifting path can be selected in the reverse stroke in dependence on the machining type (roughing, finishing) and on the manufacturing processes (internal gears or external gears).

A measuring system 4 is provided at the direct drive 3 which measures the movement of the direct drive or the position of the eccentric shaft 1. The position of the shaping head transversely to the shaping direction can hereby be measured indirectly. To permit a more exact determination of the position of the shaping head, in which likewise vibrations and a specific play in interaction between the drive and the movement of the shaping head 8 can be taken into account, a measuring system 5 is furthermore provided which is arranged at the shaping head 8 and thus directly monitors the position of the shaping head 8. The shaping head can thus be tracked in accordance with a desired shaping tool path, whereby a high precision and a fast reaction are achieved on deviations e.g. due to vibrations and elasticities of the machine.

The direct drive 3 is a brushless torque motor in this context. Such a comparatively slowly rotating motor is characterized by a very high acceleration and extremely good accuracy. A control or feedback control electronic system 20 is provided for the control or feedback control of the position of the shaping head and processes the data generated by the measuring systems 4 and 5 and correspondingly controls the direct drive 3

Figure 2:
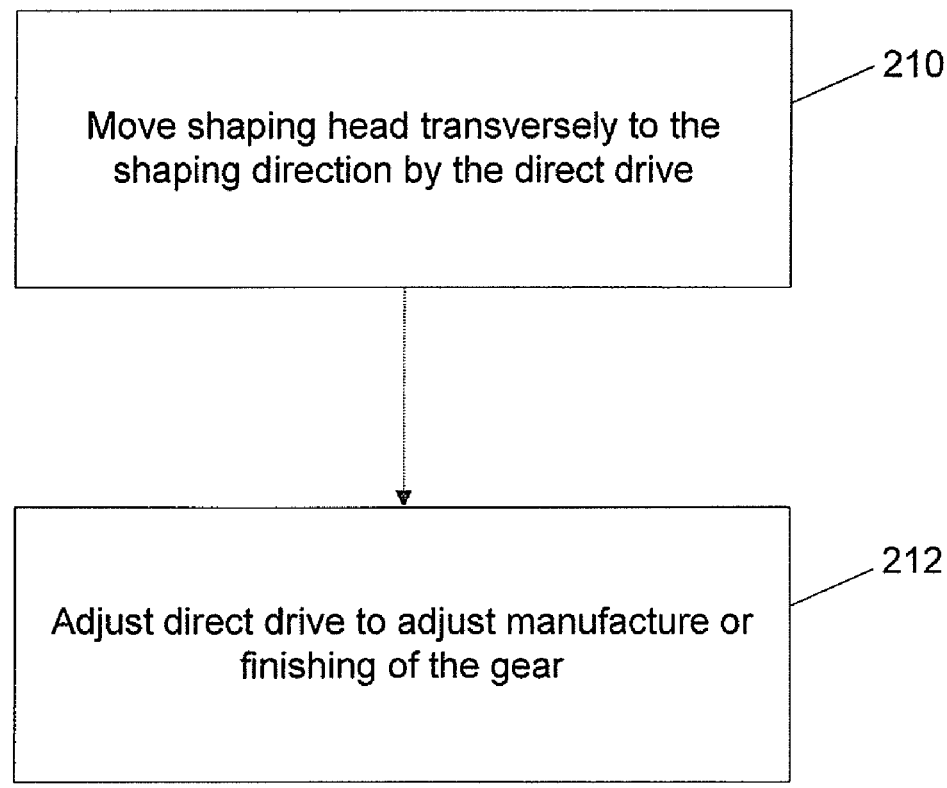
FIG. 2 shows an example flowchart of a method in accordance with the present disclosure.

Additionally, FIG. 2 shows an example method that may include moving a shaping head transversely to a shaping direction by a direct drive for the delivery and lifting of the shaping tool to a workpiece at 210, and electronically adjusting the direct drive to vary the delivery and lifting of the tool at 212.

The invention claimed is:

1. A gear shaping machine for the manufacture or machining of gears comprising:
    a shaping tool;
    a shaping head bearing the shaping tool, wherein the shaping head is movable transversely to a shaping direction for the delivering of the shaping tool radially to the workpiece and for the lifting of the shaping tool radially from the workpiece, and
    a direct drive that moves the shaping head transversely to the shaping direction.

2. The gear shaping machine in accordance with claim 1, wherein the direct drive drives an eccentric shaft which moves the shaping head transversely to the shaping direction via an intermediate lever.

3. The gear shaping machine in accordance with claim 2, wherein the shaping head is rotatably supported at bearing points and the intermediate lever engages at the shaping head at a position between the bearing points and the shaping tool.

4. The gear shaping machine in accordance with claim 1, further comprising a measuring system which is arranged at the shaping head and monitors a position of the shaping head.

5. The gear shaping machine in accordance with claim 1, further comprising a measuring system which is arranged at the direct drive and monitors a movement of the direct drive.

6. The gear shaping machine in accordance with claim 2, further comprising a measuring system which monitors a position of the eccentric shaft.

7. The gear shaping machine in accordance with claim 2, further comprising a first measuring system arranged at the shaping head and a second measuring system arranged at the direct drive which monitors a position of the eccentric shaft.

8. The gear shaping machine in accordance with claim 1, wherein the direct drive is a brushless torque motor.

9. A method for the manufacture or finishing of gears using a gear shaping machine, comprising moving a shaping head bearing a shaping tool transversely to a shaping direction by a direct drive for the delivery of the shaping tool radially to a workpiece and for the lifting of the shaping tool radially from the workpiece.

10. The method in accordance with claim 9, further comprising electronically controlling the direct drive.

11. The method in accordance with claim 9, further comprising monitoring the position of the shaping head transversely to the shaping direction by a measuring system and tracking the position in accordance with a desired shaping tool path.

12. The method in accordance with claim 9, further comprising varying a path of the shaping tool differently in a working stroke and in a reverse stroke by adjusting the direct drive.

13. The method in accordance with claim 12, further comprising independently varying a lifting and delivery of the shaping tool from stroke movement.

14. The method in accordance with claim 13, further comprising adjusting a tooth flank direction by adjusting the direct drive.

15. The method in accordance with claim 9, further comprising varying a lifting path of the shaping tool in a reverse stroke in dependence on machining type, including rough or finish machining, and in dependence on a manufacturing processes, including internal gears or external gears, by adjusting the direct drive electronically.

16. A gear shaping machine for the manufacture or machining of gears comprising:
   a shaping tool;
   a shaping head bearing the shaping tool, wherein the shaping head is movable transversely to a shaping direction for the delivering of the shaping tool radially to the workpiece and for the lifting of the shaping tool radially from the workpiece,
   a direct drive that moves the shaping head transversely to the shaping direction wherein the direct drive drives an eccentric shaft which moves the shaping head transversely to the shaping direction via an intermediate lever; and
   a controller to electronically adjust the direct drive to vary a path of the shaping tool differently in a working stroke and in a reverse stroke, and to vary the path of the shaping tool differently for rough machining as compared to finish machining.

17. The gear shaping machine in accordance with claim 16, wherein the shaping head is rotatably supported at bearing points and the intermediate lever engages at the shaping head at a position between the bearing points and the shaping tool.

18. The gear shaping machine in accordance with claim 17, further comprising a measuring system which is arranged at the shaping head and monitors a position of the shaping head.

19. The gear shaping machine in accordance with claim 17, further comprising a measuring system which is arranged at the direct drive and monitors movement of the direct drive.

20. The gear shaping machine in accordance with claim 19, wherein the direct drive is a brushless torque motor.

* * * * *